United States Patent
Antola et al.

(10) Patent No.: US 10,501,162 B2
(45) Date of Patent: Dec. 10, 2019

(54) METHOD AND SYSTEM FOR OPTIMISING OPERATION OF VESSEL

(71) Applicant: Eniram Oy, Helsinki (FI)

(72) Inventors: Matti Antola, Helsinki (FI); Antti Solonen, Espoo (FI); Jussi Pyörre, Ojakkala (FI)

(73) Assignee: ENIRAM OY, Helsinki (FI)

( * ) Notice: Subject to any disclaimer, the term of this patent is extended or adjusted under 35 U.S.C. 154(b) by 0 days.

(21) Appl. No.: 16/320,248

(22) PCT Filed: Aug. 2, 2017

(86) PCT No.: PCT/FI2017/050561
§ 371 (c)(1),
(2) Date: Jan. 24, 2019

(87) PCT Pub. No.: WO2018/029397
PCT Pub. Date: Feb. 15, 2018

(65) Prior Publication Data
US 2019/0270502 A1    Sep. 5, 2019

(30) Foreign Application Priority Data
Aug. 9, 2016 (FI) .................. 20165610

(51) Int. Cl.
*B63J 99/00* (2009.01)
*G01C 21/12* (2006.01)
(Continued)

(52) U.S. Cl.
CPC .............. *B63J 99/00* (2013.01); *B63B 57/00* (2013.01); *B63H 1/28* (2013.01); *G01C 21/12* (2013.01);
(Continued)

(58) Field of Classification Search
CPC ......... B63J 99/00; B63J 99/008; G01C 21/12; G06F 17/00; G06F 19/00
(Continued)

(56) References Cited

U.S. PATENT DOCUMENTS 4,666,411 A * 5/1987 Silvester .................. B63H 5/16
440/66
6,371,038 B1 * 4/2002 Beauchamp ........... B63H 25/46
114/151
(Continued)

FOREIGN PATENT DOCUMENTS

EP        3042843 A1    7/2016
WO   2015129337 A1    9/2015
(Continued)

OTHER PUBLICATIONS

BOS, "How MetOcean Data Can Improve Accuracy and Reliability of Vessel Performance Estimates", Proceedings of the HullPIC 2016 conference, pp. 106-114, http://data.hullpic.info/HullPIC2016.pdf.
(Continued)

*Primary Examiner* — Tan Q Nguyen
(74) *Attorney, Agent, or Firm* — Buchanan Ingersoll & Rooney PC

(57) ABSTRACT

Disclosed are a method and a virtual sensor system for determining the speed through water of a marine vessel. The method includes obtaining propeller revolutions per minute and at least one of torque at propeller, propulsion power, thrust and engine fuel flow, obtaining speed over ground of the vessel and using the obtained data and hydrodynamic modelling to determine the speed through water of the vessel.

20 Claims, 2 Drawing Sheets

(51) Int. Cl.
| | |
|---|---|
| *B63B 57/00* | (2006.01) |
| *G01C 21/16* | (2006.01) |
| *G01P 3/00* | (2006.01) |
| *G05D 1/02* | (2006.01) |
| *G01C 21/20* | (2006.01) |
| *B63H 1/28* | (2006.01) |
| *G01P 5/00* | (2006.01) |
| *B63B 59/04* | (2006.01) |

(52) U.S. Cl.
CPC ............ *G01C 21/16* (2013.01); *G01C 21/203* (2013.01); *G01P 3/00* (2013.01); *G01P 5/00* (2013.01); *G05D 1/0206* (2013.01); *B63B 59/04* (2013.01); *B63J 2099/008* (2013.01)

(58) Field of Classification Search
USPC .......................................................... 701/21
See application file for complete search history.

(56) References Cited

U.S. PATENT DOCUMENTS

| | | | | |
|---|---|---|---|---|
| 2009/0048726 | A1* | 2/2009 | Lofall | B63H 21/12 701/21 |
| 2010/0106350 | A1 | 4/2010 | Alston | |
| 2014/0336853 | A1 | 11/2014 | Bradenham et al. | |
| 2015/0090170 | A1* | 4/2015 | Guglielmo | B63H 25/38 114/163 |
| 2017/0341722 | A1* | 11/2017 | Baraov | B63B 1/285 |

FOREIGN PATENT DOCUMENTS

| | | |
|---|---|---|
| WO | 2016038249 A1 | 3/2016 |
| WO | 2016110693 A1 | 7/2016 |

OTHER PUBLICATIONS

International Search Report (PCT/ISA/210) dated Oct. 11, 2017, by the European Patent Office as the International Searching Authority for International Application No. PCT/FI2017/050561.

Written Opinion (PCT/ISA/237) dated Oct. 11, 2017, by the European Patent Office as the International Searching Authority for International Application No. PCT/FI2017/050561.

* cited by examiner

METHOD AND SYSTEM FOR OPTIMISING OPERATION OF VESSEL

TECHNICAL FIELD

The present disclosure relates generally to optimisation of vessel operation; and more specifically, to a method and a sensor system for determining the speed through water (STW) of the vessel for use in optimising vessel operation.

BACKGROUND

Marine transportation vessels, such as container ships and tankers, consume large amounts of fuel. In recent times, the trends of digitalization and performance optimisation have led to the vessels using complex systems that produce large quantities of data related to the vessels' efficiency. However, by far the most critical measurements for evaluating vessel performance are those pertaining to vessel speed and energy consumption. Energy consumption roughly grows as the third power of speed, so it is extremely important to measure the speed accurately. The speed over ground (SOG) may be accurately evaluated using known space-based navigation systems like the Global Positioning System (GPS), but this is not equal to STW in the presence of ocean or tidal currents.

The efficiency of the vessel, and hence for example the attained STW at a certain propeller revolution per minute (RPM), may depend on the hull and propeller condition, which can deteriorate due to biological fouling, paint degradation and other factors, or may improve due to a dry docking or cleaning of the hull. To achieve a nearly real-time hull and propeller performance tracking, an accurate STW is required to distinguish the slowly evolving fouling signal from the noisy background. Also, assessing the onboard efficiency of any navigational operation, the key is to know how much the vessel has gained or lost in speed if the RPM or power is kept constant.

The most common sensor type to measure STW for a vessel is the Doppler Log, which transmits ultrasound pulses from the vessel, and measures the backscatter echo. The frequency shift (Doppler shift) can be utilized to calculate the speed of the vessel through water. However, this technique of measuring STW fails to provide an accurate reading in water with a lesser amount of impurity because the technique calculates the STW based on the backscatter echo from bubbles, biological material, and turbidity in water. Indeed, the regular techniques for measuring STW have issues that are commonly known in the industry, see e.g. BOS, M. (2016), *How MetOcean Data Can Improve Accuracy and Reliability of Vessel Performance Estimates*, Proceedings of the HullPIC 2016 conference, http://data.hull-pic.info/HullPIC2016.pdf.

When examining Doppler Log data, two separate issues stand out. First, due to the aforementioned difficulties, the noise level in the speed measurement is often high, and the speed logs can sometimes behave in a very erratic manner. Secondly, the speed logs experience calibration issues, which means that the long-term average difference between SOG and the measured STW clearly differs from zero. Moreover, the calibration error can change over time, either due to crew recalibrating the STW Log device or due to calibration depending on circumstances, such as sea water temperature. Both issues are visualized in the FIGS. 1 and 2, wherein FIG. 1 illustrates an STW log with erratic behaviour and FIG. 2 an STW log with calibration error.

Alternatively, STW can be approximated using modelling based on propeller RPM alone (as in US 2009/0048726), but this approximation is crude and does not provide an accurate STW. To make the approximation more accurate, additional data relating to wind and sea state is typically used (as in WO 2015/129337). This approach has the downside of depending on many data sources that are more prone to breaking.

Therefore, considering the foregoing discussion, there exists a need to overcome the aforementioned drawbacks of conventional ways to measure the STW for a vessel.

SUMMARY

The present disclosure seeks to provide a method that combines different data sources to produce a high-quality, low-bias STW measurement. The present disclosure also seeks to provide a sensor system for determining the STW of a marine vessel. An aim of the present disclosure is to at least partially overcome the problems encountered in prior art, especially relating to measuring STW and to efficiently quantifying energy efficiency aspects of the vessel.

In one aspect, an embodiment of the present disclosure provides a method for determining the speed through water of a vessel for optimisation of vessel operation, using a sensor system, the method comprising:
- obtaining propeller revolutions per minute and at least one of torque at propeller, propulsion power, thrust, and engine fuel consumption;
- obtaining speed over ground of the vessel; and
- using the obtained data and hydrodynamic modeling to determine the speed through water of the vessel.

In another aspect, an embodiment of the present disclosure provides a sensor system for determining the speed through water of a marine vessel, the sensor system comprising:
- a first receiver configured to receive propeller revolutions per minute and at least one of torque at propeller, propulsion power, thrust, and engine fuel consumption;
- a second receiver configured to receive speed over ground of the vessel; and
- at least one processor configured to determine the speed through water of the vessel, based on the received data and hydrodynamic modeling.

Moreover, data from one or more speed through water logs or from oceanographic current forecasts can be used to increase the accuracy and reliability of the determined STW.

Embodiments of the present disclosure substantially eliminate or at least partially address the aforementioned problems in the prior art, and enables accurate determination of the STW of a marine vessel.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Wherever possible, like elements have been indicated by identical numbers.

Embodiments of the present disclosure will now be described, by way of example only, with reference to the following diagrams wherein.

Figure 1:
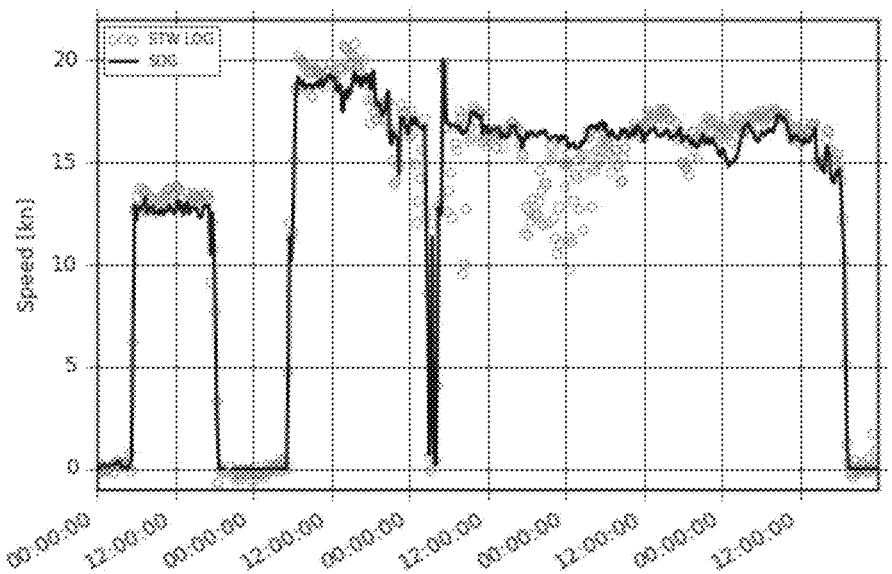
FIG. 1 illustrates an STW log with erratic behaviour.
Figure 2:
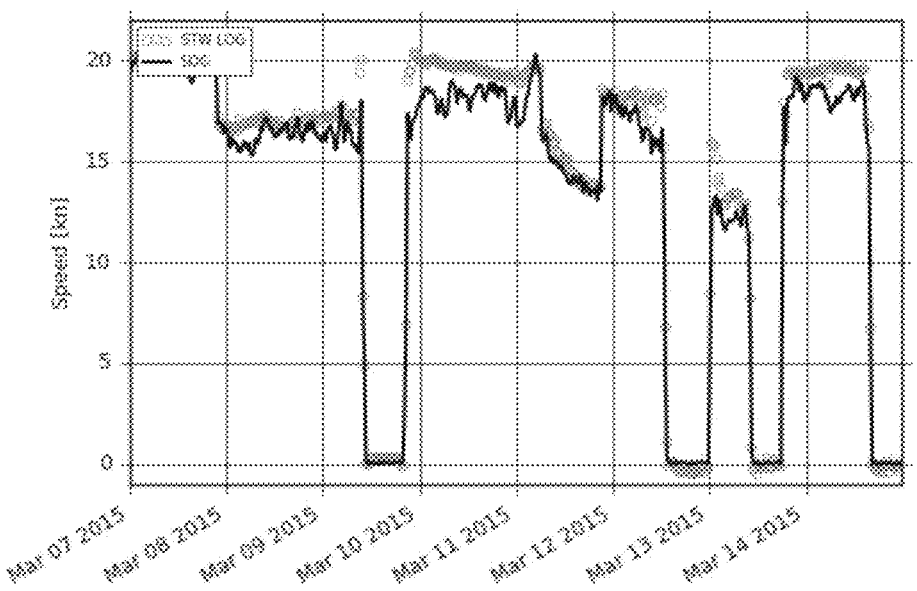
FIG. 2 illustrates an STW log with calibration error.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for determining the speed through water of the vessel for optimisation of vessel operation, using a sensor system, comprising:

obtaining propeller revolutions per minute and at least one of torque at propeller, propulsion power, thrust, and engine fuel consumption;

obtaining speed over ground of the vessel; and using the obtained data and hydrodynamic modeling to determine the STW of the vessel.

The present description thus provides a STW measurement relevant for operational optimisation of a vessel. Traditionally, optimising operation of the vessel has been carried out using the STW measured by an STW log, which is inadequate due to calibration and noise issues. Alternatively, STW has been modelled based on propeller revolutions per minute possibly augmented with data relating to wind and sea state. The former approach is too crude to provide an accurate STW and the latter approach has the downside of depending on many data sources that are more prone to errors and might not be available. In contrast, the present disclosure allows to determine an accurate and robust STW with only a few generally available data sources and novel hydrodynamic modelling.

In the present description, by vessel are meant any kinds of waterborne vessels, typically marine vessels. Most typically the vessel is a cargo ship or large cruise vessel, but the present disclosure is also applicable for yachts, for example.

According to an embodiment, the at least one of the propeller revolutions per minute, torque at propeller, propulsion power, thrust and engine fuel consumption is a measurement value resulting from a corresponding indirect measurement based on vessel vibrations. Indeed, instead of using a direct measurement of for example the propeller revolutions, it is possible to obtain this measurement value or data from an indirect measurement based on vessel vibrations. Such indirect measurement may not lead to exactly the same numerical value, but it gives the relative value. Such a relative value can then be taken into account in the final calculation of the speed through water.

According to an embodiment, the determined speed through water is rendered for example on a display, and is used by the person navigating the vessel to optimise the operation. Optimisation of operation means for example selection of a route of the vessel, selection of a speed of the vessel or both, for example by chasing sea currents. Optimisation may relate to decreasing energy consumption of the vessel, while at the same time keeping up the schedule of a commercial vessel or similar, i.e. to finding an optimal combination of speed and route, while minimising fuel consumption.

In another embodiment, the determined speed through water is used for assessing the performance of the vessel. The performance can be used for instance to determine the optimal time to wash the vessel's hull in order to decrease amount of biological growth on the hull with the least cost.

According to an embodiment, the method further comprises obtaining data from the STW log, and using the obtained data for determining the STW of the vessel and for calibrating the STW log data. In this embodiment, the determined STW is more accurate and hence allows more detailed operational optimisation.

According to another embodiment, the method still further comprises obtaining oceanographic current data and using said data in determining STW of the vessel. This data can be obtained from an outside source, for example weather service providers. Oceanographic current in this description means ocean currents, which are continuous, directed movements of seawater generated by forces acting upon the mean flow, such as breaking waves, wind, the Coriolis effect, cabbeling, temperature and salinity differences, or tides, which are caused by the gravitational pull of the Sun and Moon. Adding current data further improves the accuracy of the determined STW.

The method provides a STW measurement that is more robust and accurate than what can be obtained using traditional methods. The accuracy improves when adding more inputs. The data sources can be combined, for example, using a statistical state-space model. One possible formulation is detailed below.

In another embodiment, the STW is determined in real time. This allows for example optimisation of the steering of the ship, so that the fuel efficiency is maximised.

The hydrodynamic model to determine STW can be built starting from the open water propeller characteristic curves. In an open water approximation, the performance of a propeller at a given speed of water flow and rotation may be described with two dimensionless functions: the thrust coefficient $K_Q$ and the torque coefficient $K_T$. These depend on the torque 'Q' associated the propeller and the trust 'T' at the propeller as follows:

$$K_Q(J; \bar{\alpha}) = \frac{Q}{\rho D^5 n^2}$$

$$K_T(J; \bar{\beta}) = \frac{T}{\rho D^4 n^2}$$

The above formulations are parameterized for a given propeller by the set of parameters $\alpha$, $\beta$, and propeller diameter D as well as propeller rotations per minute (RPM) n. In addition, $\rho$ is the water density. Moreover, $K_Q$ and $K_T$ are decreasing functions of the dimensionless advance number 3, which is defined as follows:

$$J = v_A/(nD)$$

In the above relation, $v_A$ is the water speed at the propeller. In the present description, this can be approximated with STW. In a typical operational range of the vessel, the functions $K_Q$ and $K_T$ can be approximated with a low-order polynomial, such as linear or quadratic.

In the hydrodynamic model, the resistance experienced by a vessel may be represented by the function $R = R(\bar{v}_w, \bar{u}_R; \bar{\gamma})$, where $v_W$ is the STW, $u_R$ is a vector associated with relative wind, waves, and other resistance sources, and $\gamma$ represents the resistance coefficients.

The resistance $R(\bar{v}_w, \bar{u}_R; \bar{\gamma})$ may be further divided into two parts, the first being a calm-sea resistance, i.e. $R_{cs}$, and the second term describing the additional resistance experienced due to external conditions other than calm-sea, i.e. $\Delta R$. Calm sea is defined as no winds, no waves, deep ocean conditions, etc.

Further, the calm-sea resistance $R_{cs}$ may be determined by calculating the value of resistance variables in calm sea conditions, denoted $\bar{u}_{R,CS}(\bar{v}_w)$, and using the following equation:

$$R_{cs}(\bar{v}_w; \bar{\gamma}) = R(\bar{v}_w, \bar{u}_{R,CS}(\bar{v}_w); \bar{\gamma})$$

Therefore, the term $R_{cs}$ contains the expected calm sea hydrodynamic resistance and also for example the expected aerodynamic resistance (corresponding to head wind speed equal to the speed through water).

The resistance experienced due to external conditions other than calm-sea (i.e. $\Delta R$) may be determined using the following function:

$$\Delta R(\bar{v}_w, \bar{u}_R; \bar{\gamma}) = R(\bar{v}_w, \bar{u}_R; \bar{\gamma}) - R_{cs}(\bar{v}_w; \bar{\gamma})$$

The $\Delta R$ term is usually small compared to the calm-sea term and encodes the resistances caused by non-calm-sea conditions.

Further, when the thrust T of the propeller and the resistance R experienced by a vessel are equal, the following functions may be used to represent the thrust coefficient $K_Q$ and the torque coefficient $K_T$, $$K_Q\left(\frac{v_w}{n}; \bar{\alpha}'\right) = \frac{Q}{n^2}$$

$$K_T\left(\frac{v_w}{n}; \bar{\beta}'\right) = \frac{R_{cs}(v_w; \bar{\gamma}) + \Delta R}{n^2}$$

In the event where the dependence on D and $\rho$ may be included in the parameters $\alpha$ and $\beta$, these equations can be solved to obtain expressions for Q and n as follows:

$$Q = f(v_w, \Delta R; \bar{\alpha}', \bar{\beta}', \bar{\gamma})$$

$$n = g(v_w, \Delta R; \bar{\alpha}', \bar{\beta}', \bar{\gamma})$$

The functions f and g are dependent on the chosen form of $K_T$ and $K_Q$. In an embodiment, the parameters $\alpha$, $\beta$, and $\gamma$ are unknown parameters, and are estimated based on data.

In an embodiment, the above pair of equations is solved, analytically or numerically, for $\Delta R$ and $v_W$, therewith having a function of Q and n to determine STW.

In an embodiment, the data sample rate is higher than the rate at which sea-faring conditions typically change, and $\Delta R$ may be modelled as a slowly evolving time-dependent variable. Then the STW for the vessel may be calculated using the following state space formulation:

$$Q_t = f(\hat{v}_{w,t}, \Delta \hat{R}_t; \bar{\alpha}', \bar{\beta}', \bar{\gamma}) + \varepsilon_{1,t}$$

$$n_t = g(\hat{v}_{w,t}, \Delta \hat{R}_t; \bar{\alpha}', \bar{\beta}', \bar{\gamma}) + \varepsilon_{2,t}$$

$$v_{g,t} = \hat{v}_{w,t} + \hat{c}_t + \varepsilon_{3,t}$$

$$\hat{v}_{w,t} = \hat{v}_{w,t-1} + \eta_{1,t}$$

$$\hat{c}_t = \hat{c}_{t-1} + \eta_{2,t}$$

$$\Delta \hat{R}_t = \Delta \hat{R}_{t-1} + \eta_{3,t}$$

In these formulations, f and g are functions defined by the relations given above, Q is torque of the propeller, $v_g$ is speed over ground, n is propeller RPM, $\varepsilon$ is a random variable describing measurement noise, and $\eta$ is a random variable controlling the evolution speed of the state. In an embodiment, $\varepsilon$ and $\eta$ are distributed according to a multivariate Gaussian distribution, uncorrelated in time. Variables denoted with a hat are the state space variables to be estimated: $\hat{v}_w$ is the estimated STW, $\Delta \hat{R}$ the estimated extra resistance, and $\hat{c}$ the estimated oceanographic current. All variables are measured or estimated at a time t. Crucially, as $\Delta \hat{R}$ is an estimated parameter, no direct data related to winds or waves, for instance, is required as a data source.

Further, the parameters $\alpha$, $\beta$, and $\gamma$ in the aforementioned state-space formulation may not be considered as constants values pertaining to the fact that the mentioned parameter may change, for example, due to draft changes or if the ship develops fouling. Therefore, these parameters can also be taken as slowly changing parameters in time, although the time scale should be even slower than for $\Delta R$.

In one embodiment, the state-space formulation is augmented with an observation equation for data from the STW log:

$$v_{w,t} = e^{-\hat{x}_t} \hat{v}_{w,t} + \varepsilon_{4,t}$$

$$\hat{x}_t = \hat{x}_{t-1} + \eta_{4,t}$$

Here $v_W$ is STW and $\hat{x}$ is a state variable related to calibrating the STW log data, $\varepsilon$ is a random variable describing measurement noise, and $\eta$ is a random variable controlling the evolution speed of the state.

In another embodiment, the above-mentioned state-space formulation may be augmented with an observation equation for a forecasted oceanographic current $c_f$, as follows:

$$c_t = \hat{c}_t + \varepsilon_{5,t}$$

wherein $\hat{c}$ the estimated oceanographic current, and $\varepsilon$ is a random variable describing measurement noise.

In an embodiment, there are data sources corresponding to resistances, such as weather data like wind or waves etc., or corresponding measured values, or other operating conditions, and $\Delta R$ is partially modelled based on the data. The downside of this approach is that the number of inputs grows, meaning that the model becomes more prone to errors in the inputs and the implementation of the sensor system becomes more cumbersome. With the technique presented here, these extra data sources are not required.

In one embodiment, the unknown parameters used in the model may be estimated using a dynamical state space estimation technique, for example Kalman filtering or smoothing.

The present disclosure accordingly provides a novel statistical state-space model to estimate the STW for a vessel, for calibration of water logs and for estimating current. Such a state-space formulation is essential in combining all the data sources to determine STW reliably.

The determined STW has many important practical applications. According to an embodiment, the determined STW is used for optimising the operation of the vessel. The optimisation is selected from a group comprising optimising time to clean the hull, optimising steering of the vessel, optimising speed profile of voyage, or optimising voyage route.

In one aspect, an embodiment of the present disclosure provides a sensor system for estimating STW of a marine vessel, the sensor system comprising:
- a first receiver configured to receive propeller revolutions per minute and at least one of torque at propeller, propulsion power, thrust, and engine fuel consumption;
- a second receiver configured to receive speed over ground of the vessel; and
- at least one processor configured to determine the STW of the vessel, based on the received data and hydrodynamic modeling.

In one embodiment, the sensor system of the present disclosure receives data from different data sources to produce a high-quality, low-bias STW measurement. These data sources are described next. In another embodiment, the first receiver is configured to receive at least one of the propeller revolutions per minute, torque at propeller, propulsion power, thrust and engine fuel consumption from a corresponding indirect measurement based on vessel vibrations, as is explained in more detail above.

The sensor system comprises a first receiver configured to receive or acquire RPM of propeller and at least one of torque at propeller, propulsion power, thrust, and engine fuel consumption, or a corresponding combination of indirect measurements based on vessel vibrations. In an embodiment, the first receiver may be a data source, such as a sensor unit having at least one sensor. In another embodiment, the first receiver is configured to acquire data from the ship's automation system. Further, the first receiver may also include elements such as transduction functions with an analog interface circuit, a microcontroller with an integrated analog-to-digital converter (ADC), and an input/output (I/O) bus interface, a power source, an external memory in addition to the sensor, that collectively operate to receive data related to propulsion of the vessel. In an example, propulsion power, thrust, or engine fuel flow is used instead of torque at propeller. In another example, an indirect measurement of the propulsion system arises from a separate sensor device that registers vessel hull vibrations and estimates propulsion variables. For example, the data may originate from a sensor device according to WO 2016/038249.

Further, the sensor system comprises a second receiver configured to receive or acquire the speed over ground of the vessel. In one embodiment, the second receiver may be also a data source, such as a sensor unit, operable to receive the speed over ground of the vessel. In an embodiment, the speed over ground of the vessel may be gathered using space-based navigation system (sensor unit), such as global positioning system or chart plotter and the like.

In one embodiment, the sensor system also comprises a third receiver configured to receive oceanographic current data related to course of the marine vessel, wherein the processor is further configured to use the received data in determining the speed through water of the vessel. In an embodiment, the oceanographic data pertains to the forecasted oceanographic current calculated for the route of the marine vessel. In an embodiment, a forecast provider, that uses a numerical ocean model and multiple data sources to estimate the ocean current, produces the oceanographic current forecasts.

In another embodiment, the sensor system also comprises a fourth receiver configured to received data from a speed through water log, the processor being further configured to use the obtained data in determining the speed through water of the vessel and calibrating the speed through water log data. The fourth receiver may also be configured to acquire STW data from the automation system. The device is interfaced with peripheral equipment like display devices or a voyage data recorder and so forth.

The sensor system comprises of at least one processor configured to determine the STW of the vessel, based on the received data and hydrodynamic modeling. For example, the processor is configured to receive rpm of propeller and torque at propeller (i.e. data from the first receiver) and the speed over ground of the vessel (i.e. data from the second receiver), and thereafter the processor estimates parameters of the hydrodynamic model based on the obtained data to determine the STW of the vessel. One possible formulation for the hydrodynamic model has been presented earlier in this section.

In an embodiment, the processor is further configured to render the speed through water. This can be achieved for example by means of a display, wherein the speed through water is shown to the operator of the vessel.

In one embodiment, the sensor system may comprise one or more processing modules and at least one memory. Further, the memory stores instructions for determining the STW of the vessel. Additionally, the storage device may be configured to store the information received by the first, second and optional third and fourth receivers. For example, the storage device may store data such as RPM, torque, SOG, STW, and oceanographic current forecasts.

The present disclosure further relates to use of a determined speed through water for optimising operation of a vessel. The speed through water is determined according to the method described above.

The present disclosure provides a method and a system for determining a high-quality, low-bias STW. The main usage of the system is to measure the vessel's STW. The STW may be further used to calculate an accurate current, estimate the propulsive efficiency, track the propulsive efficiency over time, and/or assess the onboard efficiency of navigational operations for a marine vessel. Also the determined STW may be used to augment budgeting for a marine vessel, for example based on the determined STW, the fuel consumption of a vessel maybe determined. The determined STW can be used to optimise vessel operation. The optimisation is selected from a group comprising optimising time to clean the hull, optimising steering of the vessel, optimising speed profile of voyage, or optimising voyage route.

DETAILED DESCRIPTION OF THE DRAWINGS

Figure 3:
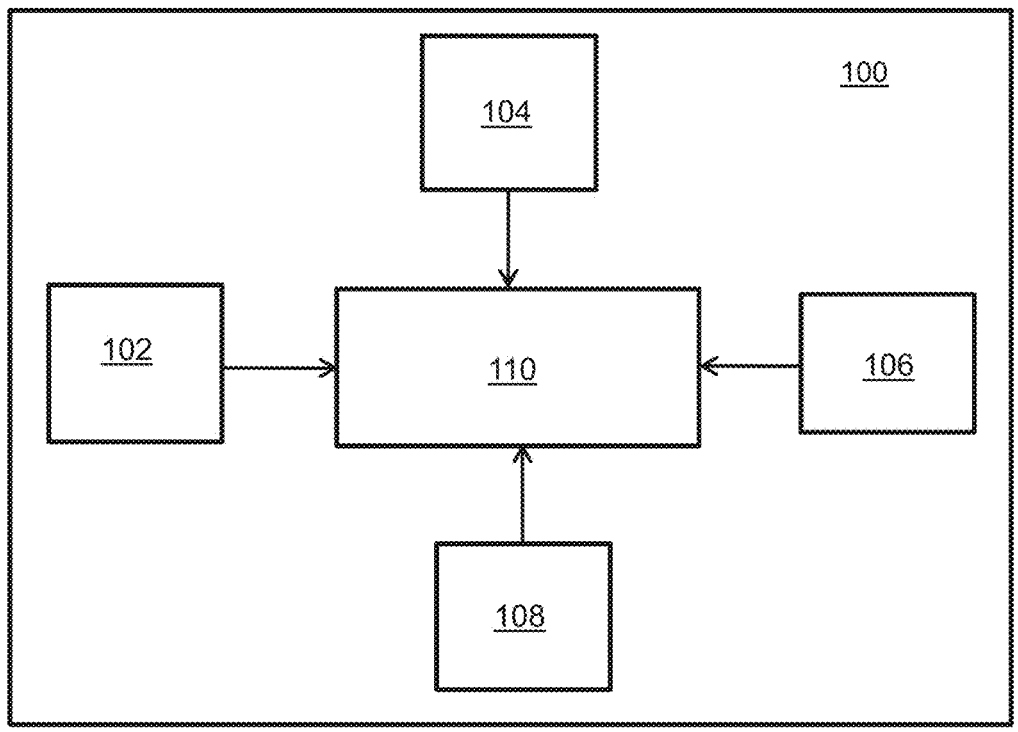
FIG. 3 illustrates a block diagram of a system for determining the STW of a marine vessel, in accordance with an embodiment of the present disclosure.

FIG. 3 illustrates a block diagram of a sensor system 100 for determining the STW of a marine vessel (not shown), in accordance with an embodiment of the present disclosure. The system 100 includes a first receiver 102 operable to receive data related to propulsion of the vessel, a second receiver 104 operable to receive data related to speed over ground of the vessel, a third receiver 106 operable to receive data of oceanographic current, and a fourth receiver 108 operable to received data from one or more STW logs. The system 100 also includes at least one processor, such as a processor 110, operatively coupled to the first, second, third and fourth receivers 102, 104, 106 and 108. The processor 110 is configured to determine the STW of the vessel, based on the received data and previous data from the first receiver 102 and the second receiver 104 and using hydrodynamic modeling. The processor 110 is further configured to use the received data from the third receiver 106 (i.e. data of oceanographic current related to course of the marine vessel) in the calculation of the STW of the vessel.

Figure 4:
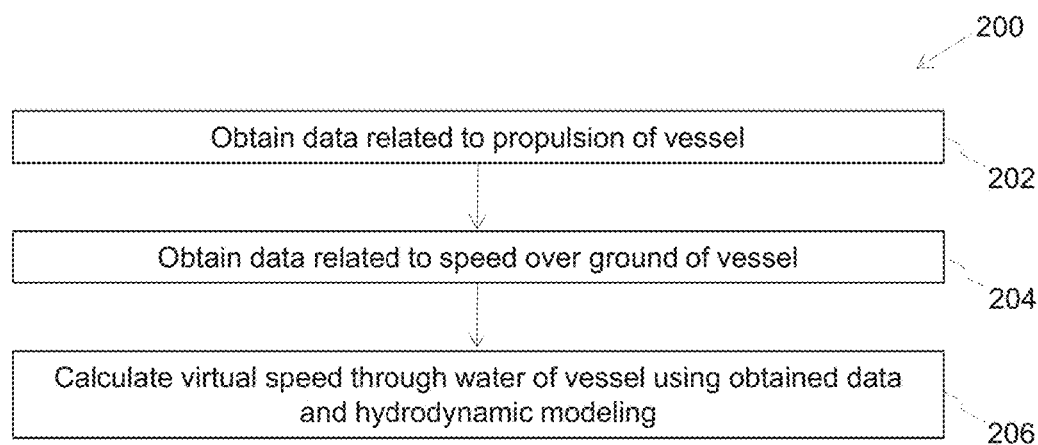
FIG. 4 is an illustration of steps of a method for determining the STW of a vessel, in accordance with an embodiment of the present disclosure.

FIG. 4 is an illustration of steps of a method 200 for determining the STW of a marine vessel, in accordance with an embodiment of the present disclosure. Those skilled in the art would recognize that the method 200 illustrate steps involved in the operation of the system 100 of the FIG. 1. At step 202, data related to propulsion of the vessel is obtained. At step 204, data related to speed over ground of the vessel is obtained. At step 206, the STW is determined using the obtained data and hydrodynamic modeling.

The steps 202 to 206 are only illustrative and other alternatives can also be provided where one or more steps are added, one or more steps are removed, or one or more steps are provided in a different sequence without departing from the scope of the claims herein. For example, the method 200 may further obtain data from one or more STW logs, and use the obtained data at steps 202 and 204 in determining the STW of the vessel. The method 200 may further obtain data related to oceanographic current and may use said data in determining the STW of the vessel. The method 200 may use a statistical state-space model to obtain the STW. Further, the method 200 may provide the STW in real time.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for determining speed through water of a vessel for optimisation of vessel operation, using a sensor system, the method comprising:
   obtaining data regarding propeller revolutions per minute and at least one of torque at propeller, propulsion power, thrust or engine fuel consumption;
   obtaining data regarding speed over ground of the vessel; and
   using the obtained data and hydrodynamic modeling to determine speed through water of the vessel.

2. A method according to claim 1, wherein at least one of the propeller revolutions per minute, torque at propeller, propulsion power, thrust or engine fuel consumption is a measurement value resulting from a corresponding indirect measurement based on vessel vibrations.

3. A method according to claim 2, comprising:
   obtaining logged data from one or more speed through water logs; and
   using the obtained logged data in determining the speed through water of the vessel and for calibrating speed through water log data.

4. A method according to claim 3, comprising:
   obtaining oceanographic current data and using said data in determining the speed through water of the vessel.

5. A method according to claim 1, comprising:
   obtaining logged data from one or more speed through water logs; and
   using the obtained logged data in determining the speed through water of the vessel and for calibrating speed through water log data.

6. A method according to claim 1, further comprising:
   obtaining oceanographic current data and using said data in determining the speed through water of the vessel.

7. A method according to claim 1, comprising:
   determining the speed through water using a statistical state-space model.

8. A method according to claim 1, comprising:
   determining the speed through water in real time.

9. A method according to claim 1, comprising:
   calculating the speed through water of the vessel using state space formulation:

$$Q_t = f(\hat{v}_{w,t}, \Delta\hat{R}_t; \overline{\alpha}', \overline{\beta}', \overline{\gamma}) + \varepsilon_{1,t}$$

$$n_t = g(\hat{v}_{w,t}, \Delta\hat{R}_t; \overline{\alpha}', \overline{\beta}', \overline{\gamma}) + \varepsilon_{2,t}$$

$$v_{g,t} = \hat{v}_{w,t} + \hat{c}_t + \varepsilon_{3,t}$$

$$\hat{v}_{w,t} = \hat{v}_{w,t-1} + \eta_{1,t}$$

$$\hat{c}_t = \hat{c}_{t-1} + \eta_{2,t}$$

$$\Delta\hat{R}_t = \Delta\hat{R}_{t-1} + \eta_{3,t}$$

wherein f and g are functions defined by relations:

$$K_Q\left(\frac{v_w}{n}; \overline{\alpha}'\right) = \frac{Q}{n^2}$$

$$K_T\left(\frac{v_w}{n}; \overline{\beta}'\right) = \frac{R_{cs}(v_w; \overline{\gamma}) + \Delta R}{n^2}$$

and Q is torque of the propeller, $v_g$ is speed over ground, n is propeller revolution per minute, $\varepsilon$ is a random variable describing measurement noise, and $\eta$ is a random variable controlling evolution speed of the state, $\hat{v}_w$ is estimated speed through water, $R_{cs}(v_w; \overline{\gamma})$ is calm sea resistance as a function of the speed through water, $\Delta\hat{R}$ is estimated extra resistance on top of calm sea resistance, $\hat{c}$ is estimated oceanographic current, and parameters $\alpha$, $\beta$ and $\gamma$ are state variables estimated based on data.

10. A method according to claim 9, wherein the relations $K_Q$ and $K_T$ are linear or quadratic functions.

11. A method according to claim 9, comprising:
   augmenting the state space formulation is augmented with equations which take into account measured speed through water data and calibrate it as follows:

$$\hat{v}_{w,t} = e^{-\hat{x}_t} v_{w,t} + \varepsilon_{4,t}$$

$$\hat{x}_t = \hat{x}_{t-1} + \eta_{4,t}$$

wherein $v_w$ is the speed through water and $\hat{x}$ is a state variable related to calibrating the speed through water log data, $\varepsilon$ is a random variable describing measurement noise, and $\eta$ is a random variable controlling the evolution speed of the state.

12. A method according to claim 9, comprising:
augmenting the state space formulation with an equation which takes into account a forecasted current as follows:

$$c_t = \hat{c}_t + \varepsilon_{5,t}$$

wherein c is an oceanographic current forecast, ĉ an estimated oceanographic current, and ε is a random variable describing measurement noise.

13. A method according to claim 9, comprising:
estimating unknown parameters of a hydrodynamic model are estimated using at least one dynamical state-space estimation technique.

14. A method according to claim 1, comprising:
optimising with the determined speed through water, operation of the vessel, where the optimising is selected from a group comprising:
optimising time to clean a hull of the vessel;
optimisation of steering of the vessel;
optimising speed profile of a voyage; and
optimising voyage route.

15. A sensor system for determining speed through water of a vessel, the sensor system comprising:
a first receiver configured to receive propeller revolutions per minute and at least one of torque at propeller, propulsion power, thrust or engine fuel consumption;
a second receiver configured to receive speed over ground of a vessel; and
at least one processor configured to determine a speed through water of a vessel, based on received data and hydrodynamic modeling.

16. A sensor system according to claim 15, wherein the first receiver is configured to receive at least one of the propeller revolutions per minute, torque at propeller, propulsion power, thrust or engine fuel consumption from a corresponding indirect measurement based on vessel vibrations.

17. A sensor system according to claim 15, comprising:
a third receiver configured to receive oceanographic current data related to course of a marine vessel, wherein the processor is configured to use received data in a calculation of speed through water of the marine vessel.

18. A sensor system according to claim 15, wherein the processor is configured to render speed through water.

19. A sensor system according to claim 15, comprising:
a fourth receiver configured to receive data from a speed through water log, the processor being configured to use obtained data for determining a speed through water of a vessel and calibrating the speed through water log data.

20. The sensor system according 19, in combination with a vessel whose speed is to be determined by the sensor system.

* * * * *